US012395845B2

(12) United States Patent
Coyle et al.

(10) Patent No.: US 12,395,845 B2
(45) Date of Patent: Aug. 19, 2025

(54) SYSTEM AND METHOD FOR IDENTIFYING COLLOCATED CELLULAR DEVICES FROM KNOWN FRAUDULENT DEVICES

(71) Applicant: VERIZON PATENT AND LICENSING INC., Basking Ridge, NJ (US)

(72) Inventors: Timothy E. Coyle, Chicopee, MA (US); Ammara Essa, Raritan, NJ (US); Matthew Kapala, North Billerica, MA (US); Hector Alejandro Garcia Crespo, North Richland Hills, TX (US); Mark David Lufburrow, Nazareth, PA (US); Jacob S. Lynch, Sacramento, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 382 days.

(21) Appl. No.: 18/175,859

(22) Filed: Feb. 28, 2023

(65) Prior Publication Data
US 2024/0292223 A1  Aug. 29, 2024

(51) Int. Cl.
*H04W 12/12* (2021.01)
*H04L 9/40* (2022.01)
*H04W 12/104* (2021.01)

(52) U.S. Cl.
CPC ......... *H04W 12/12* (2013.01); *H04L 63/1466* (2013.01); *H04W 12/104* (2021.01)

(58) Field of Classification Search
CPC .. H04W 12/12; H04W 12/104; H04L 63/1466
See application file for complete search history.

(56) References Cited

U.S. PATENT DOCUMENTS

| | | | | |
|---|---|---|---|---|
| 10,110,616 B1* | 10/2018 | Xie | ...................... | H04L 63/1425 |
| 10,841,321 B1* | 11/2020 | Athavle | .............. | H04L 63/1425 |
| 11,475,018 B2* | 10/2022 | Kempf | ................ | G06F 16/2237 |
| 11,973,773 B2* | 4/2024 | Paranjpe | ............. | H04L 63/0245 |
| 2015/0350902 A1* | 12/2015 | Baxley | .................... | H04W 4/90 |
| | | | | 726/7 |
| 2016/0127392 A1* | 5/2016 | Baxley | .................. | G06V 20/41 |
| | | | | 726/23 |
| 2016/0210450 A1* | 7/2016 | Su | ......................... | G06F 21/552 |
| 2017/0265076 A1* | 9/2017 | Richards | ............ | G06Q 30/0248 |
| 2017/0374528 A1* | 12/2017 | Bolon | .................. | H04W 24/08 |
| 2018/0332017 A1* | 11/2018 | Childress | ................ | H04L 63/08 |

(Continued)

*Primary Examiner* — Ariel A Balaoing

(57) ABSTRACT

In some aspects, the techniques described herein relate to a method including: receiving an identity of fraudulent user equipment (UE); identifying a plurality of candidate UEs based on locations associated with the fraudulent UE and a duration of a session of the fraudulent UE; computing vectors representing the plurality of candidate UEs based on activity data associated with the plurality of candidate UEs recorded during the duration; comparing the plurality of vectors to a vector associated with activity data associated with the fraudulent UE to compute distances between the plurality of candidate UEs and the fraudulent UE; sorting the plurality of candidate UEs based on the distances; storing a top subset of the plurality of candidate UEs as co-located UEs; and performing an action using the top subset of the plurality of candidate UEs.

20 Claims, 7 Drawing Sheets

(56) References Cited

U.S. PATENT DOCUMENTS

| | | | |
|---|---|---|---|
| 2021/0152526 A1* | 5/2021 | Kohout | H04L 43/08 |
| 2023/0087506 A1* | 3/2023 | Koral | H04W 36/322 |
| | | | 455/418 |
| 2023/0092778 A1* | 3/2023 | Koral | H04W 12/12 |
| | | | 455/410 |
| 2024/0171558 A1* | 5/2024 | Diffloth | H04L 63/08 |
| 2024/0406208 A1* | 12/2024 | Zukerman | G06N 20/20 |

* cited by examiner

SYSTEM AND METHOD FOR IDENTIFYING COLLOCATED CELLULAR DEVICES FROM KNOWN FRAUDULENT DEVICES

BACKGROUND INFORMATION

Subscriber Identity Module (SIM) swapping occurs when a malicious user contacts a mobile phone subscriber's carrier and causes them to activate a SIM card controlled by the malicious user. Current approaches to such behavior rely on manual investigations into such fraudulent behavior and cannot quickly and accurately identify such malicious users.

DETAILED DESCRIPTION OF EXAMPLE EMBODIMENTS

Figure 1:
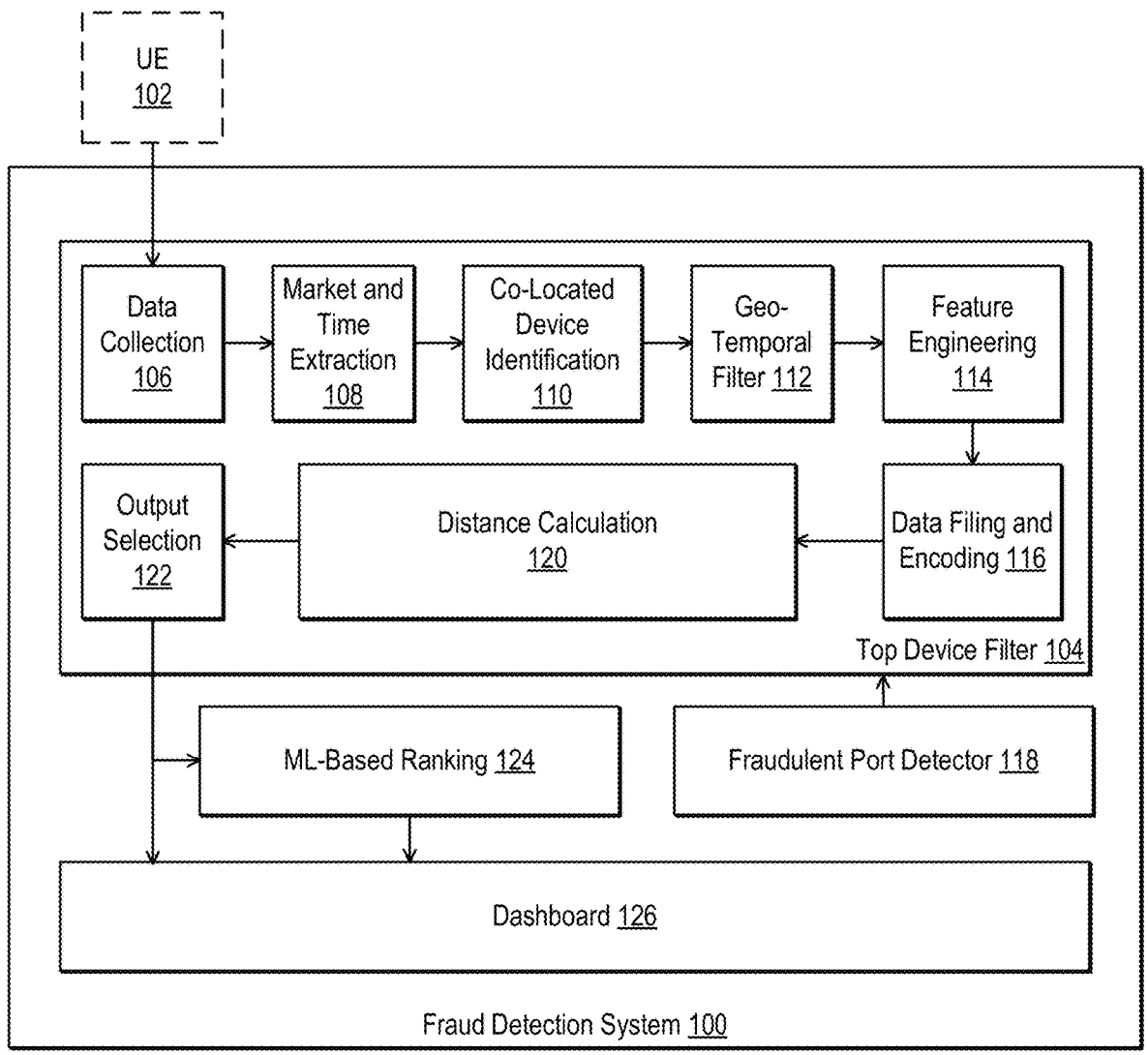
FIG. 1 is a block diagram illustrating a system for detecting co-located user equipment corresponding to a fraudulent user equipment.

The disclosed embodiments relate to methods, systems, devices, and computer-readable media for automatically identifying fraudulent behavior in a cellular network. When a fraudulent user equipment (UE) is detected in a cellular network, activity data of the fraudulent device is gathered and a large corpus of potentially co-located UE are identified. Vectors for each co-located UE are generated and compared to a vector of the fraudulent UE. In this manner, the disclosed embodiments can identify a set of potentially co-located UEs which can then be used to identify the corresponding account (and thus user) that is using the fraudulent UE. In further embodiments, an automated process for identifying fraud is disclosed. In these embodiments, when a user's mobile device number (MDN) is being ported to a new UE, a machine learning (ML) process predicts where the new UE will attach to the network. The system can then monitor the new UEs attachment behavior and determine if it matches the expected behavior. If not, the foregoing co-located device identification process can be run to identify the user of the fraudulent UE.

In some aspects, the techniques described herein relate to a method including: receiving an identity of fraudulent user equipment (UE); identifying a plurality of candidate UEs based on locations associated with the fraudulent UE and a duration of a session of the fraudulent UE; computing vectors representing the plurality of candidate UEs based on activity data associated with the plurality of candidate UEs recorded during the duration; comparing the plurality of vectors to a vector associated with activity data associated with the fraudulent UE to compute distances between the plurality of candidate UEs and the fraudulent UE; sorting the plurality of candidate UEs based on the distances; and storing a top subset of the plurality of candidate UEs as co-located UE.

In some aspects, the techniques described herein relate to a method, wherein identifying a plurality of candidate UEs based on locations associated with the fraudulent UE and a duration of a session of the fraudulent UE includes retrieving historical per-call measurement data (PCMD) for the fraudulent UE, the PCMD first recorded when the fraudulent UE was activated.

In some aspects, the techniques described herein relate to a method, further including identifying a region associated with the fraudulent UE and the duration of the session of the fraudulent UE and identifying the plurality of candidate UEs based on the region and the duration of the session.

In some aspects, the techniques described herein relate to a method, further including filtering the plurality of candidate UEs by comparing activity data of the plurality of candidate UEs to activity data of the fraudulent UE and identifying a subset of the plurality of candidate UEs that are associated with activity data that includes a location within a tunable distance from the activity data of the fraudulent UE and are recorded within a tunable duration from times associated with the activity data of the fraudulent UE.

In some aspects, the techniques described herein relate to a method, wherein computing vectors representing the plurality of candidate UEs includes adjusting a dimensionality of a given vector for a candidate UE based on a dimensionality of the vector associated with activity data associated with the fraudulent UE.

In some aspects, the techniques described herein relate to a method, wherein computing vectors representing the plurality of candidate UEs includes expanding or contracting a number of records associated with a given UE based on a number of records associated with activity data associated with the fraudulent UE.

In some aspects, the techniques described herein relate to a method, wherein computing distances between the plurality of candidate UEs and the fraudulent UE includes computing Euclidean distances between the plurality of candidate UEs and the fraudulent UE.

In some aspects, the techniques described herein relate to a method, further including: receiving a port request from a new UE; predicting a predicted attachment location for the new UE; monitoring a radio access network for an attachment request from the new UE; determining that a location associated with a base station receiving the attachment request does not match the predicted attachment location; and using an identifier of the new UE as the identifier of the fraudulent UE.

In some aspects, the techniques described herein relate to a non-transitory computer-readable storage medium for tangibly storing computer program instructions capable of being executed by a computer processor, the computer program instructions defining steps of: receiving an identity of fraudulent user equipment (UE); identifying a plurality of candidate UEs based on locations associated with the fraudulent UE and a duration of a session of the fraudulent UE; computing vectors representing the plurality of candidate UEs based on activity data associated with the plurality of candidate UEs recorded during the duration; comparing the plurality of vectors to a vector associated with activity data associated with the fraudulent UE to compute distances between the plurality of candidate UEs and the fraudulent UE; sorting the plurality of candidate UEs based on the distances; and storing a top subset of the plurality of candidate UEs as co-located UE.

In some aspects, the techniques described herein relate to a non-transitory computer-readable storage medium, wherein identifying a plurality of candidate UEs based on locations associated with the fraudulent UE and a duration of a session of the fraudulent UE includes retrieving historical per-call measurement data (PCMD) for the fraudulent UE, the PCMD first recorded when the fraudulent UE was activated.

In some aspects, the techniques described herein relate to a non-transitory computer-readable storage medium, further including identifying a region associated with the fraudulent UE and the duration of the session of the fraudulent UE and identifying the plurality of candidate UEs based on the region and the duration of the session.

In some aspects, the techniques described herein relate to a non-transitory computer-readable storage medium, further including filtering the plurality of candidate UEs by comparing activity data of the plurality of candidate UEs to activity data of the fraudulent UE and identifying a subset of the plurality of candidate UEs that are associated with activity data that includes a location within a tunable distance from the activity data of the fraudulent UE and are recorded within a tunable duration from times associated with the activity data of the fraudulent UE.

In some aspects, the techniques described herein relate to a non-transitory computer-readable storage medium, wherein computing vectors representing the plurality of candidate UEs includes adjusting a dimensionality of a given vector for a candidate UE based on a dimensionality of the vector associated with activity data associated with the fraudulent UE.

In some aspects, the techniques described herein relate to a non-transitory computer-readable storage medium, wherein computing vectors representing the plurality of candidate UEs includes expanding or contracting a number of records associated with a given UE based on a number of records associated with activity data associated with the fraudulent UE.

In some aspects, the techniques described herein relate to a non-transitory computer-readable storage medium, wherein computing distances between the plurality of candidate UEs and the fraudulent UE includes computing Euclidean distances between the plurality of candidate UEs and the fraudulent UE.

In some aspects, the techniques described herein relate to a non-transitory computer-readable storage medium, further including: receiving a port request from a new UE; predicting a predicted attachment location for the new UE; monitoring a radio access network for an attachment request from the new UE; determining that a location associated with a base station receiving the attachment request does not match the predicted attachment location; and using an identifier of the new UE as the identifier of the fraudulent UE.

In some aspects, the techniques described herein relate to a device including: a processor configured to: receive an identity of fraudulent user equipment (UE), identify a plurality of candidate UEs based on locations associated with the fraudulent UE and a duration of a session of the fraudulent UE, compute vectors representing the plurality of candidate UEs based on activity data associated with the plurality of candidate UEs recorded during the duration, compare the plurality of vectors to a vector associated with activity data associated with the fraudulent UE to compute distances between the plurality of candidate UEs and the fraudulent UE, sort the plurality of candidate UEs based on the distances, and store a top subset of the plurality of candidate UEs as co-located UE.

In some aspects, the techniques described herein relate to a device, wherein identifying a plurality of candidate UEs based on locations associated with the fraudulent UE and a duration of a session of the fraudulent UE includes retrieving historical per-call measurement data (PCMD) for the fraudulent UE, the PCMD first recorded when the fraudulent UE was activated.

In some aspects, the techniques described herein relate to a device, further including identifying a region associated with the fraudulent UE and the duration of the session of the fraudulent UE and identifying the plurality of candidate UEs based on the region and the duration of the session.

In some aspects, the techniques described herein relate to a device, further including filtering the plurality of candidate UEs by comparing activity data of the plurality of candidate UEs to activity data of the fraudulent UE and identifying a subset of the plurality of candidate UEs that are associated with activity data that includes a location within a tunable distance from the activity data of the fraudulent UE and are recorded within a tunable duration from times associated with the activity data of the fraudulent UE.

FIG. 1 is a block diagram illustrating a system for detecting co-located user equipment corresponding to a fraudulent user equipment.

In the illustrated implementation, a UE 102 is communicatively coupled to a fraud detection system 100. In some implementations, UE 102 may comprise a mobile computing device such as a mobile phone, tablet, etc. Alternatively, or in conjunction with the foregoing, UE 102 may comprise any device capable of attaching to a cellular network (e.g., mobile network interface card, laptop/desktop, etc.). In some implementations, as discussed more fully herein, UE 102 may comprise a UE that has been identified as fraudulent and requiring further analysis. Certainly, the implementation may include many other UEs, as will be discussed.

In some implementations, fraud detection system 100 may comprise one or more computing devices. For example, fraud detection system 100 may comprise a server computer or cluster of server computers. In some implementations, fraud detection system 100 may be implemented as a containerized or virtualized application and deployed in a cloud system. In some implementations, fraud detection system 100 may be implemented within a cellular network. For example, fraud detection system 100 may be implemented in a 5G core network or radio access network (RAN) via software-defined networking (SDN). Specific hardware details of both UE 102 and fraud detection system 100 are described more fully in FIG. 7.

Fraud detection system 100 includes a data collection module 106. In some implementations, data collection module 106 can receive an identifier of UE 102. In some implementations, the fraudulent UE can be identified via an International Mobile Equipment Identity (IMEI) number, International Mobile Subscriber Identity (IMSI) number, Temporary Mobile Subscriber Identity (TMSI) number, Mobile Station International Subscriber Directory Number (MSISDN) number, Mobile Equipment Identifier (MEID), Mobile Subscriber Integrated Services Digital Network (MSISDN), Mobile Subscriber Integrated Services Digital Network-International (MSISDN-I), or similar type of identifying data.

In some implementations, the data collected by data collection module 106 and associated with an active session of the fraudulent UE may comprise per-call measurement data (PCMD) associated with the fraudulent UE. Per-call measurement data in a cellular network can be data that is collected and analyzed for each individual call that is made or received on the network. This data can include various metrics such as call duration, signal strength, call quality, and call routing information. The data can be used to optimize network performance and troubleshoot issues that may be affecting call quality or connectivity. Additionally, per-call measurement data can also be used to analyze network usage patterns and to identify areas of the network that may be experiencing high traffic or congestion. This information can help network operators to plan for capacity upgrades and to optimize the use of network resources.

In some implementations, per-call measurement data for all devices (including the fraudulent UE) may be maintained as part of the cellular network operations. For example, a server in the cellular network may store PCMD for all devices on the network. Data from such a server (or multiple servers) may be accessible via application programming interfaces (APIs) exposed by the servers. Thus, in some implementations, data collection module 106 can query these APIs using the identifier of the fraudulent UE. In some implementations, the query can also include a time or region-based filter to limit the size of the returned data.

In the various implementations, the activity data associated with a fraudulent UE may include a number of measured activity data records (e.g., PCMD records). The specific size of the records is not limiting.

A market and time extraction module 108 can receive the data for UE 102 and identify a geographic region and the time of a fraudulent session. In some implementations, UE 102 is associated with a series of PCMD or similar measurements. In general, such measurements may start at an initial time (T0) when the fraudulent device has been ported onto the network and attaches to the RAN for the first time. In some implementations, the UE 102 may continue to generate activity data until the device is detected as fraudulent and disabled (Tn). During this period (T0 through Tn), the market and time extraction module 108 can identify a geographic region where the fraudulent device was active. In some implementations, the market and time extraction module 108 can obtain global positioning system (GPS) data of the fraudulent UE and define a radius around the GPS coordinates of the device. In other implementations, a coarser-grained location mechanism can be used wherein the locations of a fraudulent device can be determined using signal strength and base station locations to estimate the position of the UE 102 using the activity data. In some implementations, a military grid reference system (MGRS) may be used to represent the location of UE 102. In some implementations, the location of UE 102 during the time period (T0 through Tn) may be aggregated, and a total geographic area representing each location may be used as the geographic region. Further, in some implementations, the predicted locations of UE 102 could be expanded upon using a fixed buffer to increase the size of the predicted locations and account for discrepancies in measuring the location of UE 102. For example, a two-mile radius around every predicted location may be used; similar approaches may be used when using an MGRS location system.

A co-located device identification module 110 is then configured to collect activity data for candidate UEs in a geographic region and during the time identified by market and time extraction module 108. In some implementations, co-located device identification module 110 can identify a plurality of candidate UEs based on locations associated with UE 102 and a duration of a session of the UE 102 comprises retrieving historical PCMD for UE 102, the PCMD first recorded when UE 102 was activated. In some implementations, the candidate UEs may be UEs of the same network as the fraudulent UE. However, in other implementations, the candidate UEs may be UEs associated with other cellular networks. In such a scenario, PCMD may be shared among cellular networks accordingly.

In some implementations, the PCMD associated with the UE 102 can be used to identify a region associated with UE 102. For example, such a region may comprise a larger geographic coverage area of the cellular network, and the region may encompass numerous base stations and other devices. In such an implementation, the geographic region may be over-inclusive but useful in ensuring that as many relevant UEs are identified as possible. In some implementations, the co-located device identification module 110 can issue a request to retrieve all PCMD for the identified region and during the time period (T0 to TN) associated with UE 102. Such an amount of data may be substantial. Thus, in some implementations, the co-located device identification module 110 employs a geo-temporal filtering routine to reduce the size of the data.

A geo-temporal filter module 112 applies this geo-temporal filter to the activity associated with all the candidate UEs. In some implementations, the geo-temporal filter filters the activity data based on a combination of geographic constraints and temporal constraints. First, the filter may filter all activity data records to remove any records that are not n kilometers from a record in the activity data associated with UE 102. The activity data of UE 102 may include (or may be used to derive) locations of the UE 102. Thus, each record can be tagged with a location (e.g., GPS coordinates, MGRS grid, etc.). In the first geographic filtering, each activity data record (e.g., PCMD record) is analyzed to determine if the corresponding location is within a pre-defined distance (e.g., n kilometers) from any record in the activity data of the fraudulent UE. The result is referred to as the geo-filtered activity data. This geo-filtered activity data can then be further filtered based on a temporal constraint. Specifically, in one implementation, each record in the geo-filtered activity data can be analyzed to determine if it occurred within ±m seconds of a record associated with the activity data of UE 102. For example, each record of the activity data for the UE 102 may include a timestamp. The geo-temporal filter module 112 may analyze a timestamp of a given candidate UE record and determine if it occurred within m seconds of any record associated with a UE 102 record. The result of this second stage is referred to as the filtered activity data. In some implementations, the values of n and m may be adjustable to improve performance as desired. Further, while kilometers and seconds are used, other units may certainly be used.

A feature engineering stage 114 cleans and prepares the filtered activity data received from geo-temporal filter module 112. In some implementations, feature engineering stage 114 can include synthesizing features based on the raw activity data. For example, if the activity data is in a standardized format (e.g., PCMD), feature engineering stage 114 can include synthesizing new projections of the data in that format in a format more suitable for machine learning and comparison. For example, all measurements may be converted to base units (e.g., kilometers, microseconds, etc.) to ensure equal comparisons. Feature engineering stage 114 may also include converting raw PCMD records into arrays or tensors suitable for comparisons. The specific features in the resulting activity data are non-limiting and may be determined based on the available data and data exploration results A data filling and encoding phase 116, which fills in the filtered activity data, records and combines filtered activity data records into single-UE vectors.

In some implementations, after filtering, the filtered activity data includes a subset of activity data for the candidate UEs. Certainly, in some scenarios, candidate UEs may be removed completely, while others may have the volume of activity data reduced. Further, in some scenarios, the remaining activity data records may be missing data.

In some implementations, data filling and encoding phase 116 can include adjusting a dimensionality of a given vector for a candidate UE based on the dimensionality of the vector associated with activity data associated with UE 102. In some scenarios, data filling and encoding phase 116 can include adding zero values or other null values for any missing fields. In other scenarios, data filling and encoding phase 116 can include extrapolating data based on surrounding records for a given UE. For example, if there are three sequential (in time) records for a single UE and a middle record is missing a location, the location may be predicted based on the first and third records (e.g., as a midpoint or the same value if both are identical).

Further, in some implementations, data filling and encoding phase 116 can include expanding or contracting expanding or contracting a number of records associated with a given UE based on a number of records associated with activity data associated with UE 102. For example, in a data session, a given UE may include multiple activity data records for the duration of the fraud session. However, if the UE is placing a call during the fraud session, there may only be a single data record. To expand activity data records, such a session can be presumed to be identical throughout a given duration and the single record may be duplicated in time across the session to match the number of records in UE 102 activity data. Similarly, if the candidate UE has more records than the UE 102, some of the records for the candidate UE can be removed (if superfluous) or combined (e.g., by averaging features) to contract the size of activity data for the candidate UE. In either scenario, the feature engineering stage 114 uses the number of data records associated with the activity data of UE 102 as a target and attempts to contract or expand the number of data records for a candidate UE to match that number.

In some implementations, data filling and encoding phase 116 can further include encoding some or all fields of the data records to use a one-hot encoding for sparse or categorical features within the data records.

Finally, in some implementations, data filling and encoding phase 116 can include aggregating all data records for a candidate UE and generating a single-UE vector or record. In some implementations, data filling and encoding phase 116 can include aggregating numerical fields by computing the mean, median, or mode of the numerical values across the records. Alternatively, or in conjunction with the foregoing, encoding phase 116 can use Principal Component Analysis (PCA) to identify principal components of features across the data records. Alternatively, or in conjunction with the foregoing, encoding phase 116 can use time-frequency analysis to transform the activity data into a two-dimensional representation (time and frequency) to extract features such as power spectral density, cross-correlation, etc. Various other techniques may be used to convert time series data (e.g., activity data) to a single data record.

A distance calculation phase 120 can then compute the distances between each single-UE vector and a vector representing UE 102. In some implementations, the distance may be a Euclidean distance. Other distances may be computed, including, but not limited to, a Manhattan distance, Minkowski distance, cosine similarity, Jaccard similarity, or Mahalanobis distance. In some implementations, each distance can be associated with a corresponding candidate UE and stored for later sorting by output selection phase 122.

In some implementations, output selection phase 122 can output a top subset of the identified candidate UEs to a dashboard 126 or other type of reporting application. In some implementations, dashboard 126 can comprise a software application that can display the candidate UEs to another computing device. Alternatively, or in conjunction with the foregoing, the top UEs may be further processed by, for example, one or more machine learning (ML) algorithms in ML-based ranking component 124. For example, an ML algorithm may take, as input, the fraudulent UE vector and top UE vectors and determine which of the top UE vectors is most similar to the fraudulent UE vector. Various ML algorithms may be used to perform this classification including, but not limited to, a graph neural network, convolutional neural network (CNN), generative adversarial network (GAN), k-nearest neighbor (KNN), Structural Similarity Index (SSIM), or similar type of model.

Finally, fraud detection system 100 further includes a fraudulent port detector 118. In some implementations, fraudulent port detector 118 can monitor porting behavior of UEs and trigger the top device filter 104 to determine if a ported UE is fraudulent. Details of the operations of fraudulent port detector 118 are provided in the description of FIG. 4 and are not repeated herein.

Figure 2:
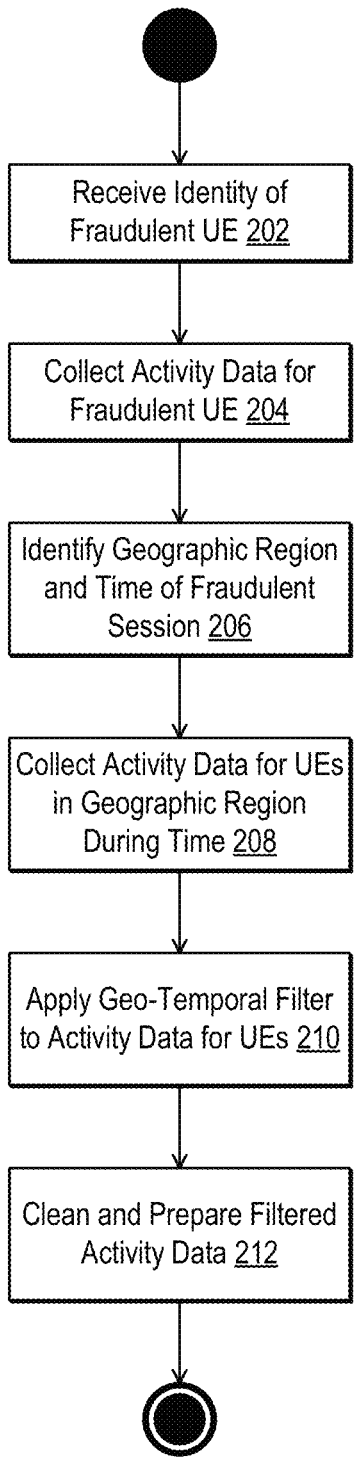
FIG. 2 is a flow diagram illustrating a method generating vector data for detecting co-located user equipment corresponding to a fraudulent user equipment.

FIG. 2 is a flow diagram illustrating a method generating vector data for detecting co-located user equipment corresponding to a fraudulent user equipment.

In step 202, the method can include receiving an identity of a fraudulent UE.

As used herein, a fraudulent UE refers to a UE that was inappropriately assigned a SIM identifier. For example, a malicious user may purchase a UE and convince a carrier to activate a SIM for the UE. In some implementations, the fraudulent UE can be identified via an International Mobile Equipment Identity (IMEI) number, International Mobile Subscriber Identity (IMSI) number, Temporary Mobile Subscriber Identity (TMSI) number, Mobile Station International Subscriber Directory Number (MSISDN) number, Mobile Equipment Identifier (MEID), Mobile Subscriber Integrated Services Digital Network (MSISDN), Mobile Subscriber Integrated Services Digital Network-International (MSISDN-I), or similar type of identifying data. In some implementations, the fraudulent UE may be identified after the fraud was committed. For example, a valid subscriber may report errant charges to their account from the fraudulent UE. Alternatively, or in conjunction with the foregoing, a fraudulent UE may be automatically detected based on errant behavior (e.g., data flows) to and from the fraudulent UE.

In step 204, the method can include collecting data associated with an active session of the fraudulent UE.

In some implementations, the data associated with an active session of the fraudulent UE may comprise per-call measurement data (PCMD) associated with the fraudulent UE. Per-call measurement data in a cellular network can be data that is collected and analyzed for each individual call that is made or received on the network. This data can include various metrics such as call duration, signal strength, call quality, and call routing information. The data can be used to optimize network performance and troubleshoot issues that may be affecting call quality or connectivity.

Additionally, per-call measurement data can also be used to analyze network usage patterns and to identify areas of the network that may be experiencing high traffic or congestion. This information can help network operators to plan for capacity upgrades and to optimize the use of network resources.

In some implementations, per-call measurement data for all devices (including the fraudulent UE) may be maintained as part of the cellular network operations. For example, a server in the cellular network may store PCMD for all devices on the network. Data from such a server (or multiple servers) may be accessible via application programming interfaces (APIs) exposed by the servers. Thus, in some implementations, step 204 can include querying these APIs using the identifier of the fraudulent UE. In some implementations, the query can also include a time or region-based filter to limit the size of the returned data.

In the various implementations, the activity data associated with a fraudulent UE may include a number of measured activity data records (e.g., PCMD records). The specific size of the records is not limiting.

In step 206, the method can include identifying a geographic region and the time of a fraudulent session.

In some implementations, a fraudulent UE is associated with a series of PCMD or similar measurements. In general, such measurements may start at an initial time (T0) when the fraudulent device has been ported onto the network and attaches to the RAN for the first time. In some implementations, the fraudulent UE may continue to generate activity data until the device is detected as fraudulent and disabled (Tn). During this period (T0 through Tn), the method can include identifying a geographic region where the fraudulent device was active. In some implementations, the method can obtain global positioning system (GPS) data of the fraudulent UE and define a radius around the GPS coordinates of the device. In other implementations, a coarser-grained location mechanism can be used wherein the locations of a fraudulent device can be determined using signal strength and base station locations to estimate the position of the fraudulent UE using the activity data. In some implementations, a military grid reference system (MGRS) may be used to represent the fraudulent UEs location. In some implementations, the fraudulent UEs location during the time period (T0 through Tn) may be aggregated, and a total geographic area representing each location may be used as the geographic region in step 206. Further, in some implementations, the fraudulent UEs predicted locations could be expanded upon using a fixed buffer to increase the size of the predicted locations and account for discrepancies in measuring the fraudulent UEs location. For example, a two-mile radius around every predicted location may be used; similar approaches may be used when using an MGRS location system.

In step 208, the method can include collecting activity data for candidate UEs in a geographic region and during the time identified in step 206. In some implementations, step 208 can include identifying a plurality of candidate UEs based on locations associated with the fraudulent UE and a duration of a session of the fraudulent UE comprises retrieving historical PCMD for the fraudulent UE, the PCMD first recorded when the fraudulent UE was activated. In some implementations, the candidate UEs may be UEs of the same network as the fraudulent UE. However, in other implementations, the candidate UEs may be UEs associated with other cellular networks. In such a scenario, PCMD may be shared among cellular networks accordingly.

In some implementations, the PCMD associated with the fraudulent UE can be used to identify a region associated with the fraudulent UE. For example, such a region may comprise a larger geographic coverage area of the cellular network, and the region may encompass numerous base stations and other devices. In such an implementation, the geographic region may be over-inclusive but useful in ensuring that as many relevant UEs are identified as possible. In some implementations, the method can issue a request to retrieve all PCMD for the identified region and during the time period (T0 to TN) associated with the fraudulent UE. Such an amount of data may be substantial. Thus, in some implementations, the method employs a geo-temporal filtering routine to reduce the size of the data.

In step 210, the method applies this geo-temporal filter to the activity associated with all the candidate UEs.

In some implementations, the geo-temporal filter filters the activity data based on a combination of geographic constraints and temporal constraints. First, the filter may filter all activity data records to remove any records that are not n kilometers from a record in the activity data associated with the fraudulent UE. The activity data of the fraudulent UE may include (or may be used to derive) locations of the fraudulent UE. Thus, each record can be tagged with a location (e.g., GPS coordinates, MGRS grid, etc.). In the first geographic filtering, each activity data record (e.g., PCMD record) is analyzed to determine if the corresponding location is within a predefined distance (e.g., n kilometers) from any record in the activity data of the fraudulent UE. The result is referred to as the geo-filtered activity data. This geo-filtered activity data can then be further filtered based on a temporal constraint. Specifically, in one implementation, each record in the geo-filtered activity data can be analyzed to determine if it occurred within m seconds of a record associated with the activity data of the fraudulent UE. For example, each record of the activity data for the fraudulent UE may include a timestamp. The method in the second stage of the geo-temporal filter may analyze a timestamp of a given candidate UE record and determine if it occurred within #m seconds of any record associated with a fraudulent UE record. The result of this second stage is referred to as the filtered activity data. In some implementations, the values of n and m may be adjustable to improve performance as desired. Further, while kilometers and seconds are used, other units may certainly be used.

In step 212, the method can include cleaning and preparing the filtered activity data. In some implementations, step 212 can include synthesizing features based on the raw activity data. For example, if the activity data is in a standardized format (e.g., PCMD), step 212 can include synthesizing new projections of the data in that format in a format more suitable for machine learning and comparison. For example, all measurements may be converted to base units (e.g., kilometers, microseconds, etc.) to ensure equal comparisons. Step 212 may also include converting raw PCMD records into arrays or tensors suitable for comparisons. The specific features in the resulting activity data is non-limiting and may be determined based on the available data and data exploration results. The method may then proceed to the method of FIG. 3 for further processing of the activity data.

Figure 3:
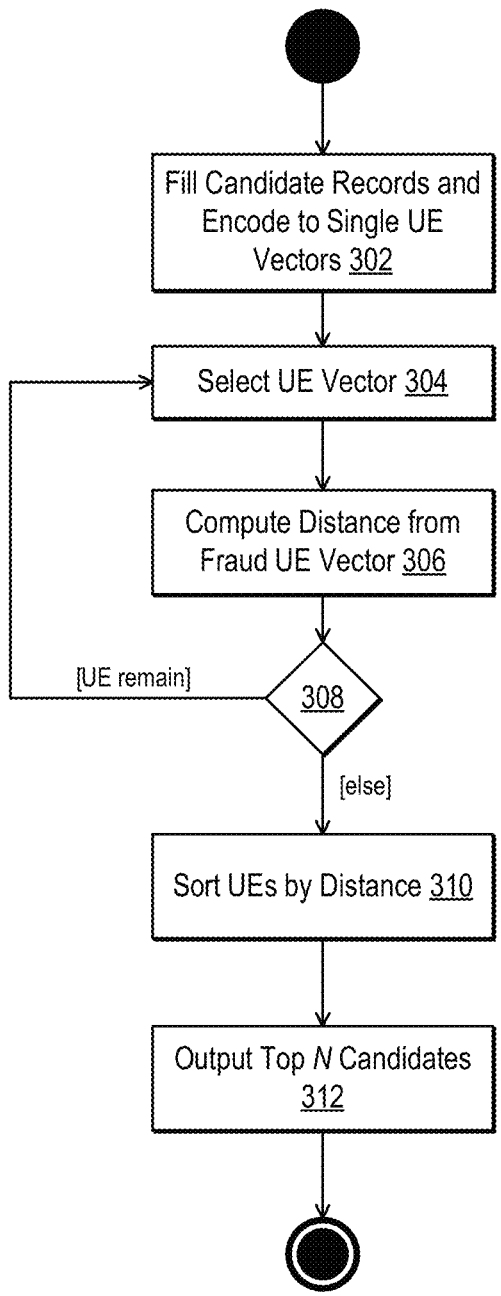
FIG. 3 is a flow diagram illustrating a method for using vector data to detect co-located user equipment corresponding to a fraudulent user equipment.

FIG. 3 is a flow diagram illustrating a method for using vector data to detect co-located user equipment corresponding to a fraudulent user equipment.

In step 302, the method can include filling in the filtered activity data records and combining filtered activity data records into single-UE vectors.

In some implementations, after filtering, the filtered activity data includes a subset of activity data for the candidate UEs. Certainly, in some scenarios, candidate UEs included in step 208 may be removed completely, while others may have the volume of activity data reduced. Further, in some scenarios, the remaining activity data records may be missing data.

In some implementations, step 302 can include adjusting a dimensionality of a given vector for a candidate UE based on the dimensionality of the vector associated with activity data associated with the fraudulent UE. In some scenarios, step 302 can include adding zero values or other null values for any missing fields. In other scenarios, step 302 can include extrapolating data based on surrounding records for a given UE. For example, if there are three sequential (in time) records for a single UE and a middle record is missing a location, the location may be predicted based on the first and third records (e.g., as a midpoint or the same value if both are identical).

Further, in some implementations, step 302 can include expanding or contracting expanding or contracting a number of records associated with a given UE based on a number of records associated with activity data associated with the fraudulent UE. For example, in a data session, a given UE may include multiple activity data records for the duration of the fraud session. However, if the UE is placing a call during the fraud session, there may only be a single data record. To expand activity data records, such a session can be presumed to be identical throughout a given duration and the single record may be duplicated in time across the session to match the number of records in the fraudulent UE activity data. Similarly, if the candidate UE has more records than the fraudulent UE, some of the records for the candidate UE can be removed (if superfluous) or combined (e.g., by averaging features) to contract the size of activity data for the candidate UE. In either scenario, the method uses the number of data records associated with the activity data of the fraudulent UE as a target and attempts to contract or expand the number of data records for a candidate UE to match that number.

In some implementations, step 302 can further include encoding some or all fields of the data records to use a one-hot encoding for sparse or categorical features within the data records.

Finally, in some implementations, step 302 can include aggregating all data records for a candidate UE and generating a single-UE vector or record. In some implementations, step 302 can include aggregating numerical fields by computing the mean, median, or mode of the numerical values across the records. Alternatively, or in conjunction with the foregoing, step 302 can include using Principal Component Analysis (PCA) to identify principal components of features across the data records. Alternatively, or in conjunction with the foregoing, step 302 can include using time-frequency analysis to transform the activity data into a two-dimensional representation (time and frequency) to extract features such as power spectral density, cross-correlation, etc. Various other techniques may be used to convert time series data (e.g., activity data) to a single data record.

In step 304, the method can include selecting a given single-UE vector from the vectors generated in step 302. Next, in step 306, the method can include computing the distance between the single-UE vector and a vector representing the fraudulent UE. In some implementations, the vector representing the fraudulent UE can be constructed using step 212 of FIG. 2 and step 302 of FIG. 3, and that discussion is not repeated herein.

In some implementations, the distance calculated in step 306 may be a Euclidean distance. Other distances may be computed, including, but not limited to, a Manhattan distance, Minkowski distance, cosine similarity, Jaccard similarity, or Mahalanobis distance. In some implementations, each distance can be associated with a corresponding candidate UE and stored for later sorting.

In step 308, the method can include determining whether any single-UE vectors remain to be analyzed. If so, the method can re-execute step 304 and step 306 for each remaining single-UE vector. As illustrated, step 304 and step 306 may be executed for all single-UE vectors, generating a distance of each unique candidate UE to the fraudulent UE. Once the method has analyzed each of the single-UE vectors, the method can proceed to step 310.

In step 310, the method can include sorting the candidate UEs by the distances computed in step 306. Then, in step 312, the method can select the top N candidates and output those candidates as potential UE co-located with the fraudulent UE. In some implementations, the value of N may comprise a fixed percentage (e.g., top 1%) of the sorted list of candidate UEs. In other implementations, the value of N may comprise a fixed number of UEs (e.g., the top fifty UEs). In some implementations, the value of N may be a combination of such approaches (e.g., the greater of the top 1% or the top fifty UEs).

While the foregoing description uses distance measurements and sorting to identify the top UEs, other techniques may be used. For example, in one implementation, the use of distance calculations can be replaced with an unsupervised learning algorithm. For example, a k-nearest neighbor clustering routine (or similar clustering routine) can be used to cluster the single-UE records. In such an implementation, the fraudulent UE may be clustered along with the candidate UEs. The method can then find the cluster that includes the fraudulent UE and may use all candidate UEs in the cluster as the top UEs.

The top UEs may be stored for further processing. In some implementations, an action may be performed by the cellular network using the top UEs as input. For example, the top UEs may be displayed in a dashboard or other type of software application for presenting information about co-located UEs. In some implementations, the UEs may be displayed in order of how close they are (based on the distance) to the fraudulent UE. As another example of an action, some or all of the top UEs may be blocked from accessing a cellular network. As another example of an action, a notification including the top UEs may be transmitted to another device. As another example of an action, a report including the top UEs may be provided to a third-party (e.g., law enforcement, security team, etc.) device.

Alternatively, or in conjunction with the foregoing, the top UEs may be further processed by, for example, one or more machine learning (ML) algorithms. For example, an ML algorithm may take, as input, the fraudulent UE vector and top UE vectors and determine which of the top UE vectors is most similar to the fraudulent UE vector. Various ML algorithms may be used to perform this classification including, but not limited to, a graph neural network, convolutional neural network (CNN), generative adversarial network (GAN), k-nearest neighbor (KNN), Structural Similarity Index (SSIM), or similar type of model.

Figure 4:
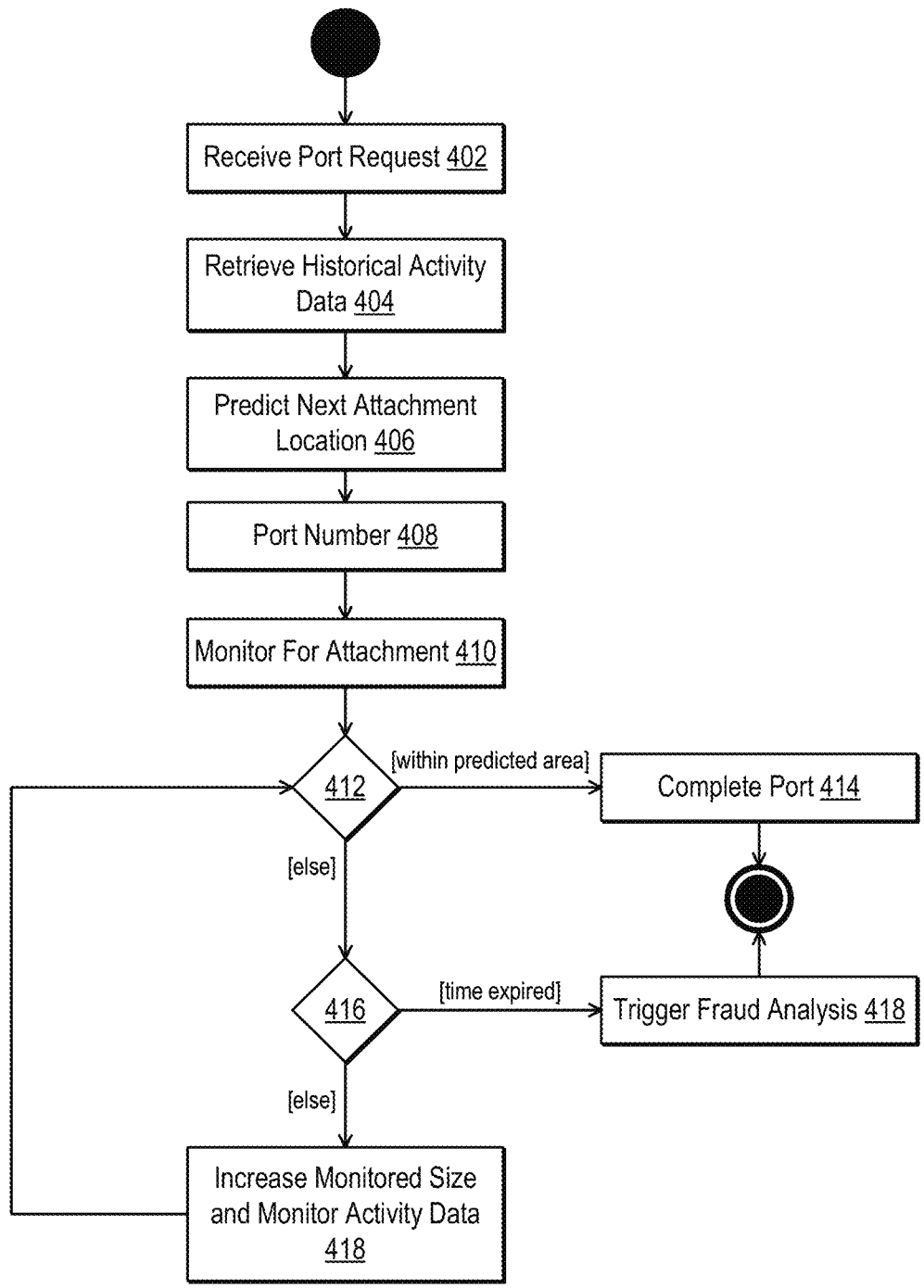
FIG. 4 is a flow diagram illustrating a method for automatically detecting a fraudulent porting of a user equipment.

FIG. 4 is a flow diagram illustrating a method for automatically detecting a fraudulent porting of a user equipment.

In step 402, the method can include receiving a request to port a mobile device number (MDN) from one UE to another UE. In some implementations, this request can comprise a machine-to-machine (M2M) request issued by a device within a cellular network. In some implementations, the request to port can be implemented as part of a standard porting process and the description of that process is not described herein for the sake of brevity.

In step 404, in response to a port request, the method can include retrieving historical activity data for the UE to be ported. In some implementations, this historical activity data can comprise PCMD for the UE currently associated with the MDN prior to porting. In some implementations, the method may retrieve PCMD over a fixed time horizon (e.g., the last day, hour, etc.). In some implementations, the method can parse and clean the data in the manner described above with respect to FIG. 2 and FIG. 3. However, in some implementations, the PCMD may not be combined into a single record and may be treated as a time series. In some implementations, only location coordinates (e.g., GPS, MGRS, etc.) data may be used for further processing.

In step 406, the method can include predicting the next attachment location for a UE given the historical activity data. In some implementations, the method may input the time series activity data into a ML algorithm to predict the most likely location the UE will be in when attaching to the cellular network. Various types of ML algorithms and model may be used including, without limitation, recurrent neural networks (RNNs), long short-term memories (LSTMs), convolutional neural networks, hidden Markov models (HMMs), Kalman filters, ARIMA (Auto-Regressive Integrated Moving Average), random forests, etc. In general, any model that can predict a future location from a series of location points may be used.

In step 408, the method can include continuing and porting the MDN from the UE modeled in step 406 to a new UE. This process can be performed by existing components of a cellular network and is not described in detail herein for the sake of clarity. In general, after step 408 completes, the new UE may be capable of attaching to the cellular network and communicating with the cellular network and other devices.

In step 410, the method can include monitoring for an attachment of the new UE. In some implementations, the method can be configured to be alerted when a RAN detects an attachment request from the new UE using, for example, S1AP (S1 Application Protocol) or RRC (Radio Resource Control) messaging. In other implementations, the core network may be configured to detect such an attachment as part of establishing a bearer with the new UE.

In step 412, when the method detects an attachment, the method can include determining if the new UEs location is within a predicted area. In some implementations, this predicted area can include a radius around the location predicted in step 406. In some implementations, the new UEs location can be computed using a signal strength indicator and a location of the base station that received the attach request from the new UE. If the new UEs location is within the predefined area, the method can complete the porting process in step 414. In some implementations, this may include updating a record associated with the new UE that the porting was successful.

Alternatively, if the new UE's location is not within the predefined area, the method may "zoom out" and determine if the new UE's location is sufficient. Specifically, in step 416, the method first determines if a time period has expired. If so, and the method has not executed step 414, the method will (in step 418) trigger the fraud analysis routine described in FIG. 2 and FIG. 3. In this manner, the timer represents a tunable duration in which the method will allow the new UE to enter the predefined area. If the timer has not expired, the method proceeds to step 418 where the predefined area is increased in size (e.g., by increasing the radius around the predicted location in step 406). Then, the method again checks if the new UE's attachment location (or a future location) was within this newly expanded area in step 412. Notably, in step 418, the method can continue to monitor the new UE's location based on RAN signaling and continuously check to determine if the new UE is within the expected area. In some implementations, the number of times the method increases the monitored area size can be configured to avoid excessively large areas. In such a scenario, the method may proceed to step 418 if the area grows too large. Alternatively, the method may stop increasing the area in step 418 when reaching a maximum and simply allow the timer to expire (or the new UE to enter the monitored area).

In the foregoing method of FIG. 4, a cellular network can preemptively predict whether a new UE that undergoes a porting process is fraudulent or not. In response, the method can then automatically trigger the methods of FIG. 2 and FIG. 3 to identify co-located devices.

Figure 5:
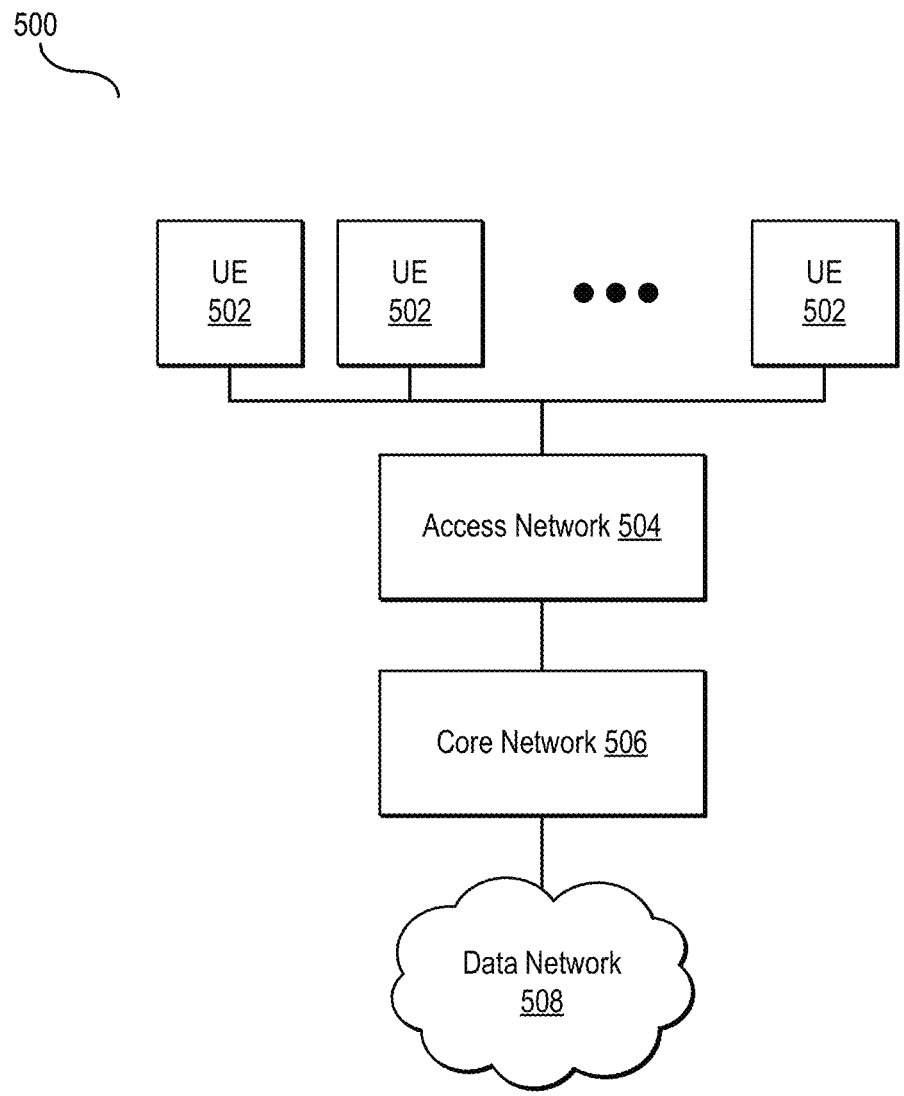
FIG. 5 is a block diagram of a cellular network according to some embodiments.

FIG. 5 is a block diagram of a cellular network according to some embodiments.

As illustrated, a system 500 includes UE 502 that accesses a data network 508) via an access network 504 and a core network 506. In the illustrated embodiment, UE 502 comprises any computing device capable of communicating with the access network 504. As examples, UE 502 may include mobile phones, smartphones, tablets, laptops, sensors, Internet of Things (IoT) devices, and any other devices equipped with a cellular transceiver. One example of a UE is provided in FIG. 7.

In the illustrated embodiment, the access network 504 comprises a network allowing over-the-air network communication with UE 502. In general, the access network 504 includes at least one base station that is communicatively coupled to the core network 506 and wirelessly coupled to UE 502.

In one embodiment, the access network 504 comprises a fifth-generation (5G) cellular access network. In one embodiment, the access network 504 and UE 502 comprise a NextGen Radio Access Network (NG-RAN). In an embodiment, the access network 504 includes a plurality of next Generation Node B (gNodeB) base stations connected to UE 502 via an air interface. In one embodiment, the air interface comprises a New Radio (NR) air interface. In some embodiments, an NR interface utilizes a Cyclic Prefix Orthogonal Frequency-Division Multiple Access (CP-OFDM) downlink modulation scheme and either CP-OFDM or Discrete Fourier Transform Spread Orthogonal Frequency Division Multiplexing (DFT-s-OFDM) uplink modulation scheme. In these embodiments, the gNodeB provides all functionality to implement and operate the air interface and negotiates uplinks and downlinks with the UE 502. The gNodeB may additionally include multiple network interfaces for communicating with the core network 506. In one embodiment, the gNodeB includes an interface to communicate with a mobility manager (e.g., an AMF) and a second interface to communicate with one or more gateway elements in the core network 506, such as an SMF for control data or a UPF for user data. In one embodiment, the mobility manager manages control plane traffic while the gateway elements manage user data traffic, as will be discussed. In some embodiments, base stations in the access network 504 are communicatively connected. For example, in a 5G network, individual gNodeB devices can be communicatively coupled via an X2 interface.

In one embodiment, the access network 504 comprises a fourth-generation (4G) cellular access network. In some embodiments, the access network 504 comprises an LTE access network. In one embodiment, the access network 504 and UE 502 comprise an Evolved Universal Mobile Telecommunications System (UMTS) Terrestrial Radio Access Network (E-UTRAN). In an embodiment, the access network 504 includes a plurality of Evolved Node B (eNodeB) base stations connected to UE 502 via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE 502. The eNodeB may additionally include multiple network interfaces for communicating with the core network 506. In one embodiment, the eNodeB includes an interface to communicate with a mobility manager (e.g., a Mobility Management Entity, MME) and a second interface to communicate with one or more gateway elements in the core network 506, such as an S-GW or P-GW. In one embodiment, the mobility manager manages control plane traffic while the gateway elements manage user data traffic, as will be discussed. In some embodiments, base stations in the access network 504 are communicatively connected. For example, in a 4G network, individual eNodeB devices can be communicatively coupled, for example, via an X2 interface or any other interface.

In some embodiments, the access network 504 may operate in a dual-connectivity mode wherein UE 502 connects to multiple base stations in the access network 504 simultaneously. In some embodiments, dual connectivity may be implemented via New Radio Dual Connectivity (NR-DC), E-UTRA-NR Dual Connectivity (EN-DC), NG-RAN-E-UTRA-NR Dual Connectivity (NGEN-DC), or NR-E-UTRA Dual Connectivity (NE-DC).

In the illustrated embodiment, the access network 504 provides access to a core network 506 to the UE 502. In the illustrated embodiment, the core network may be owned and/or operated by a mobile network operator (MNO) and provides wireless connectivity to UE 502. In the illustrated embodiment, this connectivity may comprise voice and data services. The core network 506 includes various computing devices, which are described briefly herein. Further detail of such devices is provided in FIG. 6.

At a high level, the core network 506 may include a user plane and a control plane. In one embodiment, the control plane comprises network elements and communications interfaces to allow for the management of user connections and sessions. By contrast, the user plane may comprise network elements and communications interfaces to transmit user data from UE 502 to elements of the core network 506 and to external network-attached elements in a data network 508 such as the Internet. An example of a control plane function comprises authenticating that a user can access the core network 506 (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network 506 may include a mobility manager, one or more gateways (e.g., a serving gateway and packet gateway), and a subscriber database. In practice, the core network 506 may include more components than these. In a 4G network, the mobility manager may be implemented by an MME, the serving gateway by an S-GW, the packet gateway by a P-GW, and the subscriber database by an HSS. In a 5G network, the mobility manager may be implemented by an Access Mobility Management Function (AMF), Session Management Function (SMF), and an Authentication Server Function (AUSF). Specifically, the AMF performs mobility management while the SMF performs session management, both of which are described herein. Further, the AUSF obtains authentication vectors from a subscriber database. In a 4G network, the Mobility Management Entity (MME) performs all these functions. The 4G serving gateway (S-GW) in a 5G network may be implemented by the SMF as well. Specifically, packet routing from the base station to the packet gateway may be handled by the SMF in contrast to the S-GW in a 4G network. In a 5G network, the packet gateway function user plane may be implemented by the UPF, which provides packet routing from the serving gateway to external services and manages Internet Protocol (IP) address allocation as well as content filtering and blocking. In a 5G network, the subscriber database may be implemented by a UDR, which stores the subscriber data. Access to the UDR may be mediated by a UDM, which is part of the subscriber database, as described herein.

In brief, a UE 502 communicates with the mobility manager to authenticate and establish a session or bearer with the serving and packet gateways. The mobility manager accesses the subscriber data to confirm the UE 502 identity and communicates with the serving gateway to establish the session. Once established, the UE 502 transmits data requests through the session to the packet gateway, which manages the transmitting and receiving data to and from external network services. Specific details of these elements are provided in the following figures.

In the illustrated embodiment, the access network 504 and the core network 506 are operated by an MNO. However, in some embodiments, networks 504, 506 may be operated by a private entity and may be closed to public traffic. For example, the components of the core network 506 may be provided as a single device, and the access network 504 may comprise a small form-factor base station. In these embodiments, the operator of the device can simulate a cellular network, and UE 502 can connect to this network akin to connecting to a national or regional network.

Figure 6:
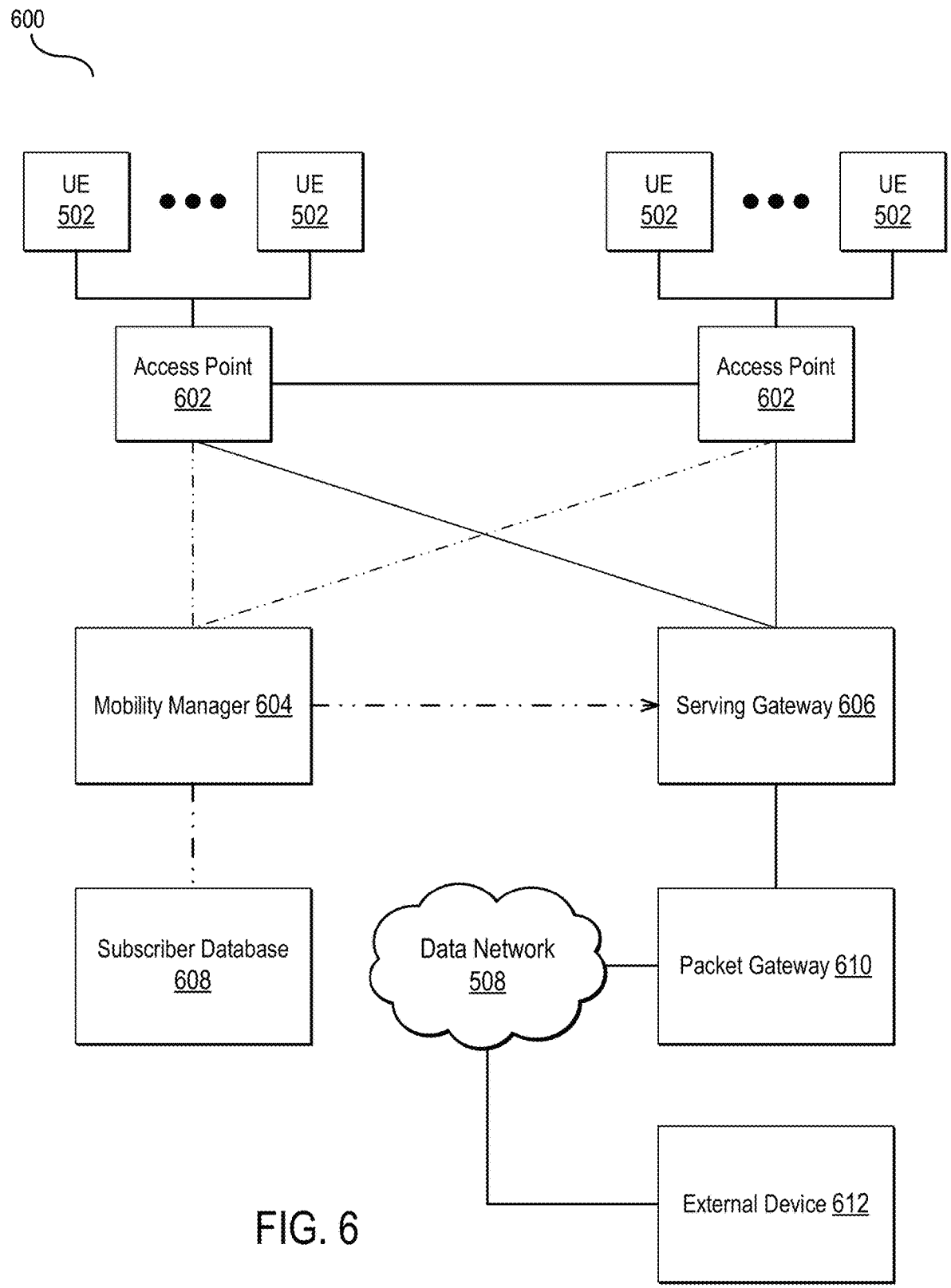
FIG. 6 is a block diagram illustrating a cellular network according to some embodiments.

FIG. 6 is a block diagram illustrating a cellular network according to some embodiments.

In the illustrated embodiment, a system 600 includes UE 502 communicatively connected to access points 602. As seen in FIG. 6, the access points 602 form an access network such as access network 504. In one embodiment, the access points 602 and UE 502 comprise a NextGen Radio Access Network (NG-RAN). In an embodiment, access points 602 comprise a plurality of gNodeB base stations connected to UE 502 via an air interface. In one embodiment, the air interface comprises a New Radio (NR) air interface. The gNodeB additionally includes multiple network interfaces for communicating with the core network and, specifically, mobility manager 604 and serving gateway 606. In one embodiment, the mobility manager 604 in a 5G network comprises an AMF. In one embodiment, the serving gateway 606 comprises an SMF for control data or UPF for user data.

In another embodiment, access points 602 comprise eNodeB base stations connected to UE 502 via an air interface.

In some embodiments, the air interface comprises an E-UTRAN Uu or LTE Uu radio air interface. In these embodiments, the eNodeB provides all functionality to implement and operate the air interface and negotiates uplinks and downlinks with the UE 502. The eNodeB additionally includes multiple network interfaces for communicating with the core network and, specifically, mobility manager 604 and serving gateway 606. In one embodiment, the mobility manager 604 comprises an MME in a 4G network. In the illustrated embodiment, solid lines between network elements 604, 606, 608, 610 represent user data traffic, while dashed lines between network elements 604, 606, 608, 610 represent control or Non-Access Stratum (NAS) traffic.

In the illustrated embodiment, the mobility manager 604 manages control plane traffic while the gateway elements 606, 610 manage user data traffic. Specifically, the mobility manager 604 may comprise hardware or software for handling network attachment requests from UE 502. As part of processing these requests, the mobility manager 604 accesses a subscriber database 608. The subscriber database 608 comprises hardware or software that stores user authorization and authentication data and validates users to the network. In some embodiments, the subscriber database 608 may comprise a UDM and UDR in a 5G network. In another embodiment, the subscriber database 608 may comprise an HSS in a 4G network. In one embodiment, the subscriber database 608 may also store a location of the user updated via a Diameter or similar protocol.

The mobility manager 604 may also be configured to create data sessions or bearers between UE 502 and serving gateway 606 or gateway 610. In one embodiment, the serving gateway 606 and gateway 610 may comprise single or separate devices. In general, the serving gateway 606 routes and forwards user data packets while also acting as the mobility anchor for the user plane during access point handovers and as the anchor for mobility between different network technologies. For idle state UE 502, the serving gateway 606 terminates the downlink data path and triggers paging when downlink data arrives for the UE 502. The serving gateway 606 manages and stores UE 502 contexts, e.g., parameters of the IP bearer service, network internal routing information. In a 5G network, the serving gateway 606 may be implemented by an SMF. In a 4G network, the serving gateway 606 may be implemented by an S-GW.

The serving gateway 606 is communicatively coupled to a gateway 610. In general, the gateway 610 provides connectivity from the UE 502 to external Packet Data Networks (PDNs) such as data network 508 by being the point of exit and entry of traffic to external networks (e.g., 508). UE 502 may have simultaneous connectivity with plurality gateways, including gateway 610 for accessing multiple packet data networks. The gateway 610 performs policy enforcement, packet filtering for each user, charging support, lawful interception, and packet screening. In the illustrated embodiment, gateway 610 also limits access to endpoints such as an external device 612. In a 5G network, the gateway 610 may be implemented by a UPF. In a 4G network, the gateway 610 may be implemented by a P-GW.

In the illustrated embodiment, an external device 612 is communicatively coupled to the core network via the data network 508. In one embodiment, the data network 508 may comprise the Internet. In the illustrated embodiment, the external device 612, such as an application server, may comprise any electronic device capable of communicating with the data network 508, and the disclosure is not limited to specific types of network devices.

Figure 7:
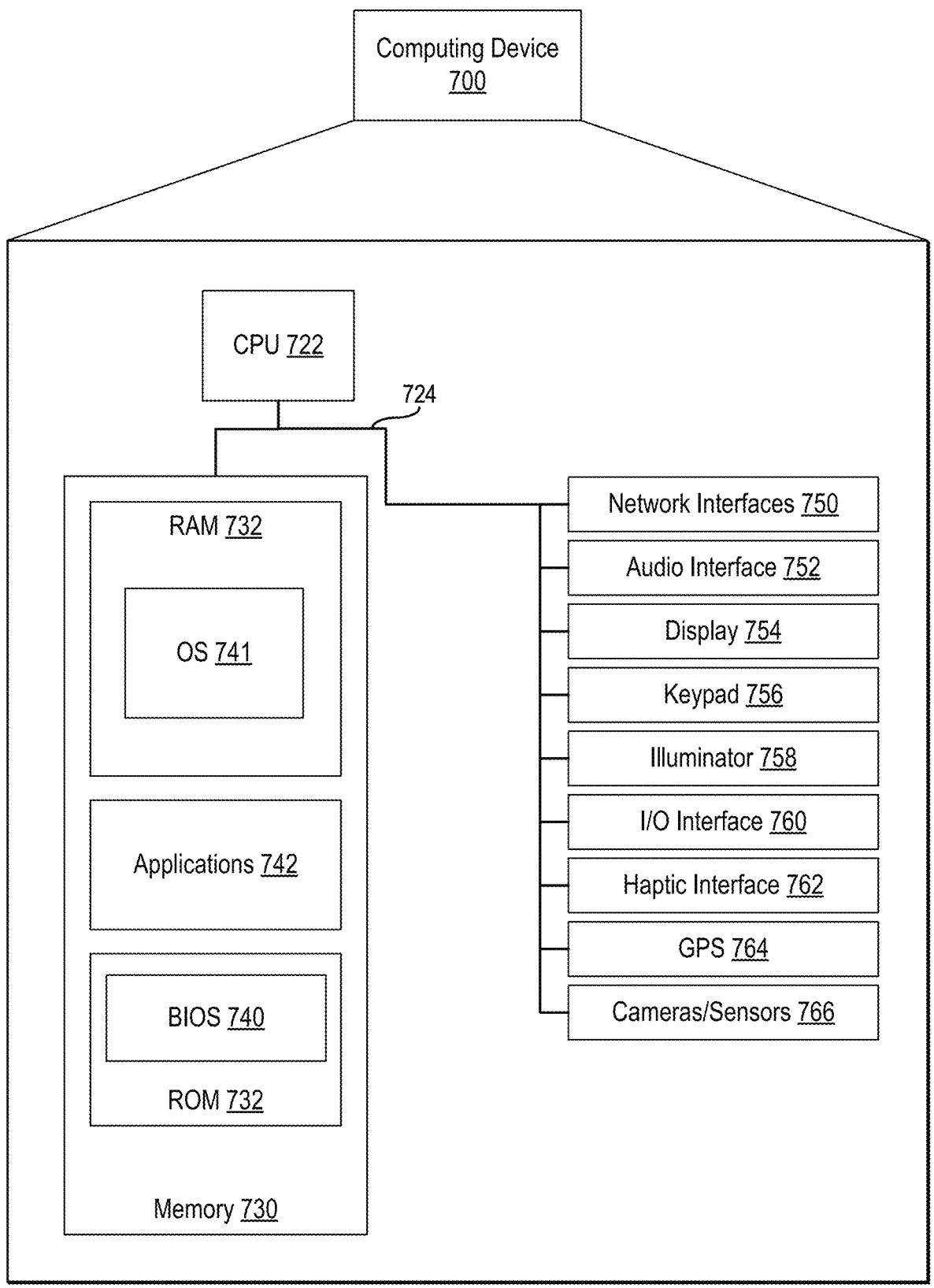
FIG. 7 is a block diagram illustrating a computing device showing an example of a client or server device used in the various embodiments of the disclosure.

FIG. 7 is a block diagram illustrating a computing device showing an example of a client or server device used in the various embodiments of the disclosure.

The computing device 700 may include more or fewer components than those shown in FIG. 7, depending on the deployment or usage of the computing device 700. For example, a server computing device, such as a rack-mounted server, may not include an audio interface 752, display 754, keypad 756, illuminator 758, haptic interface 762, Global Positioning System (GPS) receiver such as GPS receiver 764, or cameras/sensors 766. Some devices may include additional components not shown, such as graphics processing unit (GPU) devices, cryptographic co-processors, artificial intelligence (AI) accelerators, or other peripheral devices.

As shown in the figure, the computing device 700 includes a central processing unit (CPU) 722 in communication with a mass memory 730 via a bus 724. The computing device 700 also includes a network interface 750, an audio interface 752, a display 754, a keypad 756, an illuminator 758, an input/output interface (760), a haptic interface 762, a GPS receiver 764, and a camera(s) or other optical, thermal, or electromagnetic cameras/sensors 766. The computing device 700 can include a plurality of cameras/sensors 766. The positioning of the cameras/sensors 766 on the computing device 700 can change per computing device 700 model, per computing device 700 capabilities, and the like, or some combination thereof.

In some embodiments, the CPU 722 may comprise a general-purpose CPU. The CPU 722 may comprise a single-core or multiple-core CPU. The CPU 722 may comprise a system-on-a-chip (SoC) or a similar embedded system. In some embodiments, a GPU may be used in place of, or in combination with, a CPU 722. Mass memory 730 may comprise a dynamic random-access memory (DRAM) device, a static random-access memory device (SRAM), or a Flash (e.g., NAND Flash) memory device. In some embodiments, mass memory 730 may comprise a combination of such memory types. In one embodiment, the bus 724 may comprise a Peripheral Component Interconnect Express (PCIe) bus. In some embodiments, bus 724 may comprise multiple busses instead of a single bus.

Mass memory 730 illustrates another example of computer storage media for the storage of information such as computer-readable instructions, data structures, program modules, or other data. Mass memory 730 stores a basic input/output system, BIOS 740, for controlling the low-level operation of the computing device 700. The mass memory also stores an operating system 741 for controlling the operation of the computing device 700

Applications 742 may include computer-executable instructions which, when executed by the computing device 700, perform any of the methods (or portions of the methods) described previously in the description of the preceding Figures. In some embodiments, the software or programs implementing the method embodiments can be read from a hard disk drive (not illustrated) and temporarily stored in RAM 732 by CPU 722. CPU 722 may then read the software or data from RAM 732, process them, and store them in RAM 732 again.

The computing device 700 may optionally communicate with a base station (not shown) or directly with another computing device. Network interface 750 is sometimes known as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The computing device 700 also comprises an input/output interface (760) for communicating with external devices, using communication technologies, such as USB, infrared, Bluetooth™, or the like. The haptic interface 762 provides tactile feedback to a user of the client device.

The GPS receiver 764 can determine the physical coordinates of the computing device 700 on the surface of the Earth, which typically outputs a location as latitude and longitude values. GPS receiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in different orders than illustrated. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A method comprising:
 receiving an identity of fraudulent user equipment (UE);
 identifying a plurality of candidate UEs based on locations associated with the fraudulent UE and a duration of a session of the fraudulent UE;

computing vectors representing the plurality of candidate UEs based on activity data associated with the plurality of candidate UEs recorded during the duration;

comparing the plurality of vectors to a vector associated with activity data associated with the fraudulent UE to compute distances between the plurality of candidate UEs and the fraudulent UE;

sorting the plurality of candidate UEs based on the distances;

storing a top subset of the plurality of candidate UEs as co-located UEs; and performing an action using the top subset of the plurality of candidate UEs.

2. The method of claim 1, wherein identifying a plurality of candidate UEs based on locations associated with the fraudulent UE and a duration of a session of the fraudulent UE comprises retrieving historical per-call measurement data (PCMD) for the fraudulent UE, the PCMD first recorded when the fraudulent UE was activated.

3. The method of claim 1, further comprising identifying a region associated with the fraudulent UE and the duration of the session of the fraudulent UE and identifying the plurality of candidate UEs based on the region and the duration of the session.

4. The method of claim 3, further comprising filtering the plurality of candidate UEs by comparing activity data of the plurality of candidate UEs to activity data of the fraudulent UE and identifying a subset of the plurality of candidate UEs that are associated with activity data that includes a location within a tunable distance from the activity data of the fraudulent UE and are recorded within a tunable duration from times associated with the activity data of the fraudulent UE.

5. The method of claim 1, wherein computing vectors representing the plurality of candidate UEs comprises adjusting a dimensionality of a given vector for a candidate UE based on a dimensionality of the vector associated with activity data associated with the fraudulent UE.

6. The method of claim 1, wherein computing vectors representing the plurality of candidate UEs comprises expanding or contracting a number of records associated with a given UE based on a number of records associated with activity data associated with the fraudulent UE.

7. The method of claim 1, wherein computing distances between the plurality of candidate UEs and the fraudulent UE comprises computing Euclidean distances between the plurality of candidate UEs and the fraudulent UE.

8. The method of claim 1, further comprising:
receiving a port request from a new UE;
predicting an attachment location for the new UE;
monitoring a radio access network for an attachment request from the new UE;
determining that a location associated with a base station receiving the attachment request does not match the attachment location; and
using an identifier of the new UE as the identifier of the fraudulent UE.

9. A non-transitory computer-readable storage medium for tangibly storing computer program instructions capable of being executed by a computer processor, the computer program instructions defining steps of:
receiving an identity of fraudulent user equipment (UE);
identifying a plurality of candidate UEs based on locations associated with the fraudulent UE and a duration of a session of the fraudulent UE;

computing vectors representing the plurality of candidate UEs based on activity data associated with the plurality of candidate UEs recorded during the duration;

comparing the plurality of vectors to a vector associated with activity data associated with the fraudulent UE to compute distances between the plurality of candidate UEs and the fraudulent UE;

sorting the plurality of candidate UEs based on the distances;

storing a top subset of the plurality of candidate UEs as co-located UEs; and performing an action using the top subset of the plurality of candidate UEs.

10. The non-transitory computer-readable storage medium of claim 9, wherein identifying a plurality of candidate UEs based on locations associated with the fraudulent UE and a duration of a session of the fraudulent UE comprises retrieving historical per-call measurement data (PCMD) for the fraudulent UE, the PCMD first recorded when the fraudulent UE was activated.

11. The non-transitory computer-readable storage medium of claim 9, further comprising identifying a region associated with the fraudulent UE and the duration of the session of the fraudulent UE and identifying the plurality of candidate UEs based on the region and the duration of the session.

12. The non-transitory computer-readable storage medium of claim 11, further comprising filtering the plurality of candidate UEs by comparing activity data of the plurality of candidate UEs to activity data of the fraudulent UE and identifying a subset of the plurality of candidate UEs that are associated with activity data that includes a location within a tunable distance from the activity data of the fraudulent UE and are recorded within a tunable duration from times associated with the activity data of the fraudulent UE.

13. The non-transitory computer-readable storage medium of claim 9, wherein computing vectors representing the plurality of candidate UEs comprises adjusting a dimensionality of a given vector for a candidate UE based on a dimensionality of the vector associated with activity data associated with the fraudulent UE.

14. The non-transitory computer-readable storage medium of claim 9, wherein computing vectors representing the plurality of candidate UEs comprises expanding or contracting a number of records associated with a given UE based on a number of records associated with activity data associated with the fraudulent UE.

15. The non-transitory computer-readable storage medium of claim 9, wherein computing distances between the plurality of candidate UEs and the fraudulent UE comprises computing Euclidean distances between the plurality of candidate UEs and the fraudulent UE.

16. The non-transitory computer-readable storage medium of claim 9, further comprising:
receiving a port request from a new UE;
predicting an attachment location for the new UE;
monitoring a radio access network for an attachment request from the new UE;
determining that a location associated with a base station receiving the attachment request does not match the attachment location; and
using an identifier of the new UE as the identifier of the fraudulent UE.

17. A device comprising:
a processor configured to:
receive an identity of fraudulent user equipment (UE), identify a plurality of candidate UEs based on locations associated with the fraudulent UE and a duration of a session of the fraudulent UE, compute vectors representing the plurality of candidate UEs based on activity data associated with the plurality of candidate UEs recorded during the duration, compare the plurality of vectors to a vector associated with activity data associated with the fraudulent UE to compute distances between the plurality of candidate UEs and the fraudulent UE, sort the plurality of candidate UEs based on the distances, store a top subset of the plurality of candidate UEs as co-located UEs, and performing an action using the top subset of the plurality of candidate UEs.

18. The device of claim 17, wherein identifying a plurality of candidate UEs based on locations associated with the fraudulent UE and a duration of a session of the fraudulent UE comprises retrieving historical per-call measurement data (PCMD) for the fraudulent UE, the PCMD first recorded when the fraudulent UE was activated.

19. The device of claim 17, further comprising identifying a region associated with the fraudulent UE and the duration of the session of the fraudulent UE and identifying the plurality of candidate UEs based on the region and the duration of the session.

20. The device of claim 19, further comprising filtering the plurality of candidate UEs by comparing activity data of the plurality of candidate UEs to activity data of the fraudulent UE and identifying a subset of the plurality of candidate UEs that are associated with activity data that includes a location within a tunable distance from the activity data of the fraudulent UE and are recorded within a tunable duration from times associated with the activity data of the fraudulent UE.

* * * * *